United States Patent
Lohse et al.

(10) Patent No.: US 11,667,040 B2
(45) Date of Patent: Jun. 6, 2023

(54) END EFFECTOR

(71) Applicant: Broetje-Automation GmbH, Rastede (DE)

(72) Inventors: Philipp Lohse, Grenzach-Wyhlen (DE); Eugen Bekarew, Grenzach-Wyhlen (DE); Matthias Meyer, Weil am Rhein (DE); Philippe Moebel, Blotzheim (FR)

(73) Assignee: Broetje-Automation GmbH, Rastede (DE)

( * ) Notice: Subject to any disclaimer, the term of this patent is extended or adjusted under 35 U.S.C. 154(b) by 383 days.

(21) Appl. No.: 16/756,697

(22) PCT Filed: Jul. 10, 2018

(86) PCT No.: PCT/EP2018/068652
§ 371 (c)(1),
(2) Date: Apr. 16, 2020

(87) PCT Pub. No.: WO2019/076498
PCT Pub. Date: Apr. 25, 2019

(65) Prior Publication Data
US 2020/0238539 A1    Jul. 30, 2020

(30) Foreign Application Priority Data
Oct. 19, 2017  (DE) ............... 20 2017 106 345.3

(51) Int. Cl.
*B25J 15/00* (2006.01)
*B25J 11/00* (2006.01)
*B29C 70/38* (2006.01)

(52) U.S. Cl.
CPC .......... *B25J 15/0019* (2013.01); *B25J 11/00* (2013.01); *B29C 70/384* (2013.01)

(58) Field of Classification Search
CPC ...... B25J 15/0019; B25J 11/00; B29C 70/384
See application file for complete search history.

(56) References Cited

U.S. PATENT DOCUMENTS

| | | | |
|---|---|---|---|
| 4,750,960 A | 6/1988 | Bubeck | |
| 6,544,367 B1 | 4/2003 | Fujimoto et al. | |

(Continued)

FOREIGN PATENT DOCUMENTS

| | | |
|---|---|---|
| DE | 60305544 | 7/2006 |
| EP | 2772348 | 9/2014 |
| WO | 2019076498 | 4/2019 |

OTHER PUBLICATIONS

"German Search Report," for German Patent Application No. 202017106345.3 dated May 17, 2018 (5 pages).

(Continued)

*Primary Examiner* — Stephen A Vu
(74) *Attorney, Agent, or Firm* — Pauly, DeVries Smith & Deffner LLC

(57) ABSTRACT

An end effector for laying down fibers on a laying mold, the end effector having at least one bobbin arrangement of a system type, the system type being defined by virtue of the fact that the bobbin arrangement has a first bobbin for providing a first fiber strand and a second bobbin for providing a second fiber strand, the rotational axes of the first and the second bobbin being arranged at an angle with respect to one another, the first fiber strand and the second fiber strand being merged over a deflection unit and being guided from a corner region of the end effector jointly into a center region of the end effector and further to a pressure roller.

20 Claims, 6 Drawing Sheets

(56) References Cited

U.S. PATENT DOCUMENTS

| | | | |
|---|---|---|---|
| 9,409,356 B2* | 8/2016 | Karb | B29C 67/24 |
| 10,000,357 B2* | 6/2018 | Brockman | B65H 59/043 |
| 11,027,504 B2* | 6/2021 | Boge | B29C 70/34 |
| 2006/0180264 A1 | 8/2006 | Kisch et al. | |
| 2007/0029030 A1 | 2/2007 | Mccowin | |
| 2008/0295954 A1* | 12/2008 | Kisch | B29C 70/384 156/543 |
| 2010/0200168 A1 | 8/2010 | Oldani et al. | |
| 2011/0117231 A1 | 5/2011 | Klockow et al. | |
| 2014/0238612 A1 | 8/2014 | Vaniglia et al. | |
| 2017/0101286 A1 | 4/2017 | Brockman et al. | |
| 2018/0036968 A1* | 2/2018 | Boge | B29C 70/545 |

OTHER PUBLICATIONS

"International Preliminary Report on Patentability," for PCT Application No. PCT/EP2018/068652 dated Apr. 21, 2020 (14 pages) with English Translation of Written Opinion.

"International Search Report and Written Opinion," for PCT Application No. PCT/EP2018/068652 dated Sep. 27, 2018 (12 pages).

* cited by examiner

END EFFECTOR

CROSS-REFERENCE TO RELATED APPLICATIONS

This application is a national stage application under 35 U.S.C. 371 of International Patent Application Serial No. PCT/EP2018/068652, entitled "End Effector," filed Jul. 10, 2018, which claims priority from German Patent Application No. DE 20 2017 106 345.3, filed Oct. 19, 2017, the disclosure of which is incorporated herein by reference.

FIELD OF THE TECHNOLOGY

The disclosure relates to an end effector for laying fibers on a laying mold and to a manipulator.

BACKGROUND

End effectors for laying fibers on laying molds are known in various embodiments from the prior art. They are usually arranged on a manipulator, in particular an industrial robot or a gantry robot. Said end effectors as a rule have a multiplicity of bobbins, from which fiber strands which comprise fibers, for example glass fibers and/or carbon fibers, are fed over a multiplicity of deflection rollers to a pressure roller. Here, as viewed along the longitudinal axis, said deflection rollers can be provided between the bobbins and the pressure roller. Since a majority of the deflections of the fiber strands take place here between the bobbins of the pressure roller and a not inconsiderable amount of installation space is required for this purpose, said end effectors are relatively large in relation to the number of installed bobbins.

Furthermore, it is known to arrange bobbins in pairs above one another on the end effector and to guide through the fiber strands from the latter between the bobbins which are arranged in pairs to the pressure roller. With an increasing number of bobbins, this ensures a very large longitudinal extent of the end effector.

It is disadvantageous in said known end effectors that they require a very large amount of installation space, the fiber strand routing is frequently very complex, and the weight of the end effector is high as a consequence.

SUMMARY

The disclosure is therefore based on the object of providing a comparatively light and compact end effector for laying fibers.

The object is achieved by way of an end effector with the features as described herein.

The end effector according to the proposal has at least one bobbin arrangement of a system type.

Here, said system type is defined by virtue of the fact that the bobbin arrangement has a first bobbin for providing a first fiber strand and a second bobbin for providing a second fiber strand, and that the rotational axes of the first and the second bobbin are arranged at an angle with respect to one another.

An exceptionally compact construction of the end effector can be achieved by virtue of the fact that the first fiber strand and the second fiber strand are merged over a deflection unit and are guided from a corner region of the end effector jointly into a center region of the end effector and further to a pressure roller. In addition, said compact construction can be scaled in a highly satisfactory manner by way of the provision of further bobbins on the end effector. Moreover, the fiber strand routing can be simplified considerably, since far fewer deflections of the fiber strands are necessary. Finally, the comparatively compact construction also makes a particularly low weight of the end effector possible.

Various embodiments provide a second bobbin arrangement of the system type. This makes a particularly symmetrical construction of the end effector possible, as a result of which the inertia thereof in the case of movements by way of the manipulator is reduced and therefore the positioning accuracy of the fibers on the laying mold is increased.

Various embodiments describe an arrangement of the pressure roller in relation to the end effector. By way of an arrangement of this type, the compactness of the end effector and the simplicity of the routing of the fiber strands to the pressure roller can be increased further.

In some embodiments, further bobbin arrangements can be provided on the end effector, the bobbins of which can be arranged, for example, as described herein. This makes a particularly compact arrangement possible, even of a relatively large number of bobbins. As described in some embodiments, the sides of the end effector can form a polygon in cross section and some embodiments include symmetrical arrangements of the bobbins with respect to one another. These make a repeating very compact construction of the end effector possible.

Further features of the system type are described herein which make improved fiber strand routing possible. Various features of the fiber strand routing over the deflection units are also described herein.

Moreover, the described object is achieved by way of a manipulator as described herein.

The same advantages arise as have already been described in the preceding text in conjunction with the end effector. Here, the end effector of the manipulator can have the above-described features of the end effector individually and/or in combination.

Various embodiments provide an end effector for laying down fibers on a laying mold, the end effector having at least one bobbin arrangement of a system type, the system type being defined by virtue of the fact that the bobbin arrangement has a first bobbin for providing a first fiber strand and a second bobbin for providing a second fiber strand, the rotational axes of the first and the second bobbin being arranged at an angle with respect to one another, the first fiber strand and the second fiber strand being merged over a deflection unit and being guided from a corner region of the end effector jointly into a center region of the end effector and further to a pressure roller.

In various embodiments, the end effector has a first bobbin arrangement of the system type and a second bobbin arrangement of the system type, wherein the fiber strands from the first bobbin arrangement are merged over a first deflection unit and are guided from a first corner region of the end effector jointly into the center region of the end effector and further to the pressure roller, and wherein the fiber strands from the second bobbin arrangement are merged over a second deflection unit which, in particular, lies opposite the first deflection unit, and are guided from a second corner region of the end effector, which second corner region, in particular, lies opposite the first corner region, jointly into the center region of the end effector and further to the pressure roller.

In various embodiments, the end effector extends along a longitudinal axis, wherein a diagonal which connects the first corner region and the second corner region intersects a projection of the pressure roller, which projection is directed parallel to the longitudinal axis, and further wherein the rotational axis of the pressure roller is arranged orthogonally with respect to the diagonal) which connects the first and the second corner region.

In various embodiments, the rotational axis of the pressure roller is arranged at an angle which does not equal 0° and/or at an angle which does not equal 90° with respect to the rotational axes of the bobbins.

In various embodiments, the end effector has one or more further bobbin arrangements of the system type, the fiber strands of which are guided in each case over the first deflection unit or the second deflection unit into the center region of the end effector, and wherein the end effector has at least 4, at least 6, at least 8, at least 12, or at least 16 bobbin arrangements of the system type.

In various embodiments, the end effector has at least two, in particular at least four, sides, on which the bobbins of the bobbin arrangements are arranged, the first bobbins being arranged on a first side of the bobbin arrangements, the fiber strands of which lead to the first deflection unit, the second bobbins being arranged on the second side of the bobbin arrangements, the fiber strands of which lead to the first deflection unit, the first bobbins can be arranged on the third side of the bobbin arrangements, the fiber strands of which lead to the second deflection unit, the second bobbins being arranged on the fourth side of the bobbin arrangements, the fiber strands of which lead to the second deflection unit.

In various embodiments, the sides of the end effector form a polygon in cross section, in the section transversely, in particular orthogonally, with respect to the longitudinal axis of the end effector, and wherein the polygon is a quadrilateral, in particular a square and/or a rhombus and/or a rectangle.

In various embodiments, the bobbins are arranged mirror-symmetrically with respect to a plane through the first and the second deflection unit and parallel to a rotational axis of a deflection roller of the deflection unit, and/or wherein the bobbins are arranged mirror-symmetrically with respect to a plane through the free corner regions of the end effector and parallel to a rotational axis of a deflection roller of the deflection unit, and/or wherein the bobbins are arranged mirror-symmetrically with respect to a plane which is orthogonal with respect to the longitudinal axis of the end effector.

In various embodiments, furthermore, the system type is defined by virtue of the fact that the bobbins of the system type are in each case a constituent part of a bobbin unit, and that the bobbin unit has a dancer roller and/or a deflection roller, and wherein the fiber strands of the respective bobbin of a bobbin unit are guided from said bobbin to the dancer roller and around the deflection roller before they are fed to the first or second deflection unit.

In various embodiments, furthermore, the system type is defined by virtue of the fact that the fiber strands of the first and the second bobbin are fed in a mirror-symmetrical manner from the deflection unit, such as from the first and second bobbin, to the pressure roller, the plane of symmetry being arranged orthogonally with respect to the rotational axis of the pressure roller.

In various embodiments, the first and/or second deflection unit has (in particular, in each case) one deflection roller for the fiber strands which are fed to them/it, and wherein the rotational axes of the deflection rollers of the first and/or second deflection unit are arranged in each case orthogonally with respect to the rotational axes of the bobbins and/or of the pressure roller.

In various embodiments, the deflection rollers of the first and/or second deflection unit are arranged in a V-shaped manner, and/or wherein the rotational axes of the deflection rollers are arranged offset radially with respect to one another.

In various embodiments, after being guided into the center region of the end effector, the fiber strands from the first deflection unit or the fiber strands from the second deflection unit are deflected by a further deflection unit, such as in each case by a further deflection unit, and are fed to the pressure roller, in particular without further deflection.

In various embodiments, the fiber strands from the first deflection unit and the fiber strands from the second deflection unit are fed to the pressure roller in an alternating manner next to one another, and wherein, arranged next to one another, they are deposited from the pressure roller as a tape consisting of fiber strands.

In various embodiments, the first and/or the second deflection unit are/is arranged in such a way that the fiber strands from the respective deflection unit run into the center region through a corridor which is delimited in the direction parallel to the longitudinal axis by way of two planes which are orthogonal with respect to the longitudinal axis and run through two mutually facing bobbin sides of two bobbins which are adjacent in the longitudinal direction.

Various embodiments provide a manipulator with an end effector as described herein.

BRIEF DESCRIPTION OF THE DRAWINGS

In the following text, the disclosure will be described in greater detail on the basis of a drawing which shows merely one exemplary embodiment and in which.

DETAILED DESCRIPTION

Figure 1:
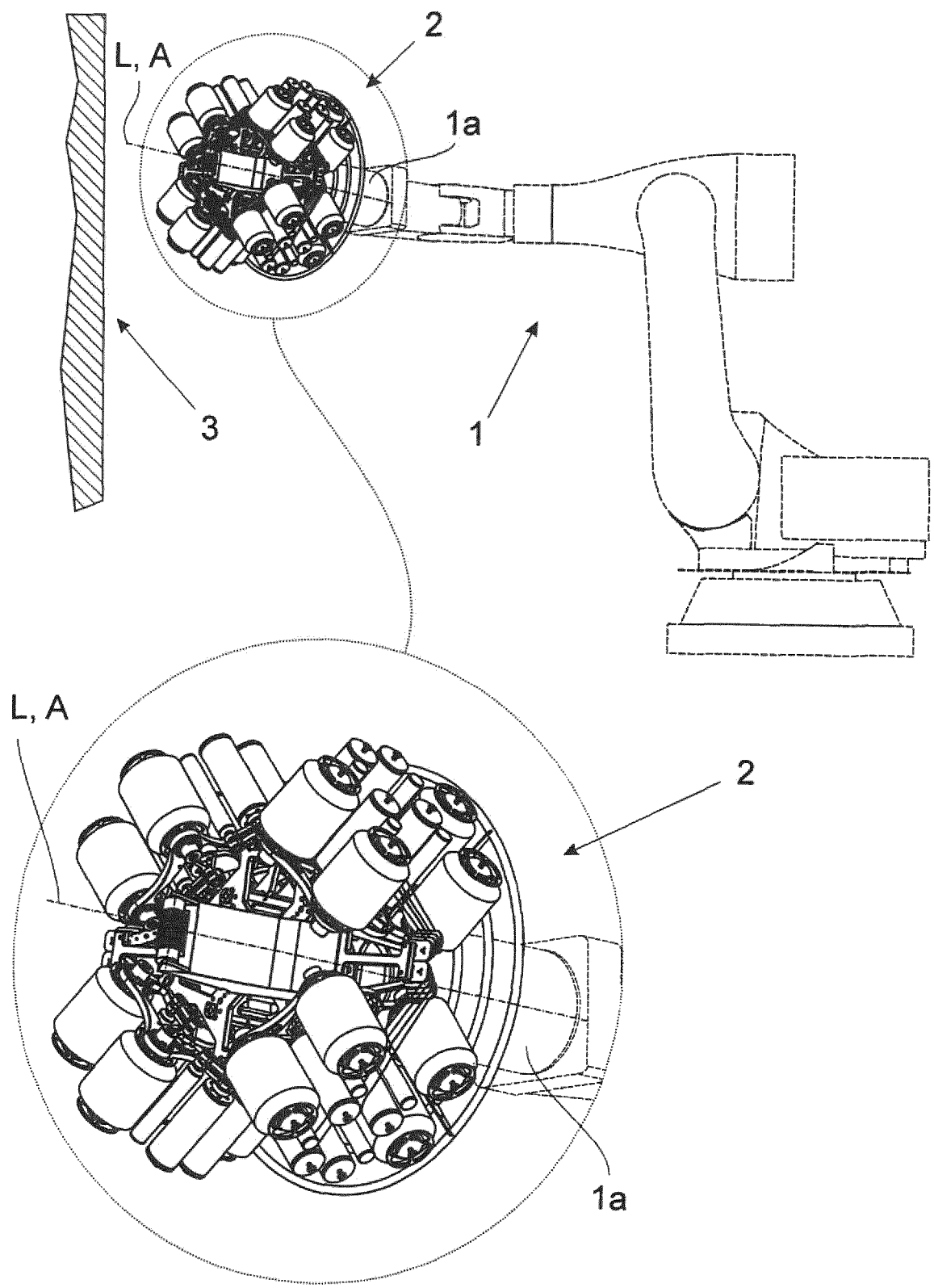
FIG. 1 shows a manipulator according to the proposal with an end effector according to the proposal, in a diagrammatic view.

FIG. 1 shows a manipulator 1 according to the proposal with an end effector 2 according to the proposal for laying fibers on a laying mold 3.

The manipulator 1 can be a robot with at least four movement axes. In the exemplary embodiment, the manipulator 1 has six rotational axes. It is an articulated arm robot. In addition or as an alternative, however, the robot can also be configured as a gantry robot. The robot can have three hand axes. That is to say, its last three movement axes in front of the manipulator flange 1a are rotational axes. The end effector 2 is held and moved by the manipulator 1 via the manipulator flange 1a of the manipulator 1.

According to the proposal, the end effector 2 has at least one bobbin arrangement 4 of a system type. Here, the bobbin arrangement 4 of the system type is defined by virtue of the fact that it has a first bobbin 5, 5a for providing a first fiber strand 6, 6a and a second bobbin 5, 5b for providing a second fiber strand 6, 6b. Here, the rotational axes $R_{S1}$, $R_{S2}$ of the first bobbin 5a and of the second bobbin 5b are arranged at an angle with respect to one another.

The angle $W_S$ between the rotational axis $R_{S1}$ of the first bobbin 5a and the rotational axis $R_{S2}$ of the second bobbin 5b, which angle encloses a deflection unit 7, can be between 20° and 160°, between 45° and 135°, or substantially 90°.

An exceptionally compact construction of the end effector 2 and particularly simple fiber strand routing can be achieved by virtue of the fact that the first fiber strand 6a and the second fiber strand 6b are merged over a deflection unit 7 and are guided from a corner region 8 of the end effector 2 jointly into a center region 9 of the end effector 2 and further to a pressure roller 10.

In the case of the end effector 2 according to the proposal, said particular compactness is achieved by way of the merging of the fiber strands 6, 6a, 6b in a corner region 8, 8a, 8b by means of the deflection unit 7 which is arranged in the latter.

This principle is shown diagrammatically in FIG. 4, in which a first bobbin arrangement 4, 4a and a second bobbin arrangement 4, 4b of the system type are shown, and on the basis of which further refinements of the end effector 2 will be described further in the following text.

Figure 4:
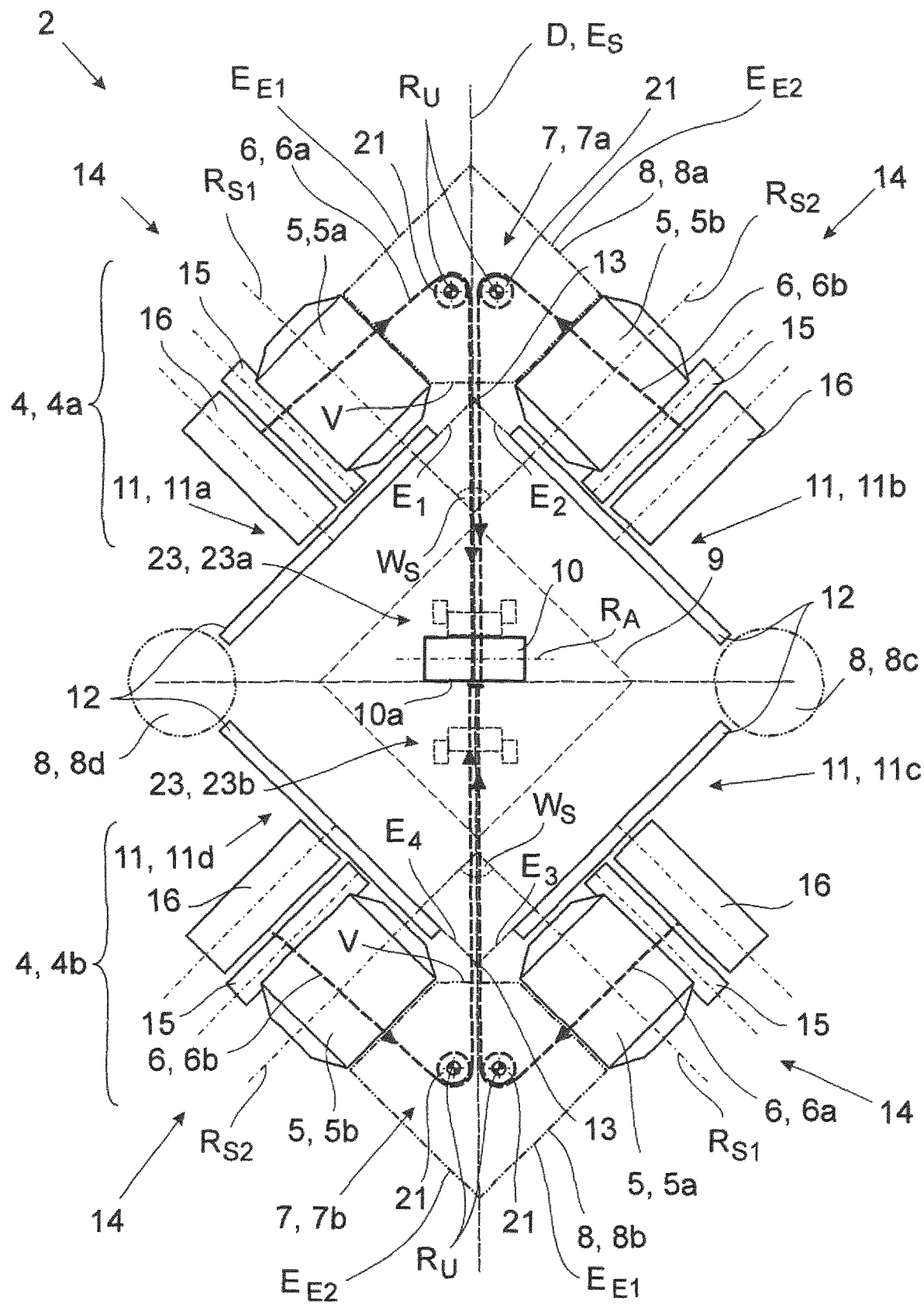
FIG. 4 shows a diagrammatic outline sketch of the present disclosure in a view which is analogous to that of FIG. 3.

As can be gathered, furthermore, from FIG. 4, the fiber strands 6 from the first bobbin arrangement 4a are here merged over a first deflection unit 7, 7a, and are guided from a first corner region 8, 8a of the end effector 2 jointly into the center region 9 of the end effector 2 and further to the pressure roller 10. The fiber strands 6 from the second bobbin arrangement 4b are here merged over a second deflection unit 7b which lies opposite, in particular, the first deflection unit 7a, in particular in relation to the longitudinal axis L of the end effector 2, and are guided from a second corner region 8b of the end effector 2, which corner region 8b lies opposite, in particular, the first corner region 8a, in particular in relation to the longitudinal axis L of the end effector 2, jointly into the center region 9 of the end effector 2 and further to the pressure roller 10. By way of said arrangement, in the case of which the bobbin arrangements 4 lie opposite one another on the end effector 2, firstly the compactness of the end effector 2 can be increased in the case of a relatively high number of bobbins 5, and secondly a construction of this type makes particularly reliable actuating of laying positions for the fiber strands 6 possible for the manipulator 1, since the moment of inertia of the end effector 2 is reduced, in particular in the case of rotational movements thereof.

Figure 2:
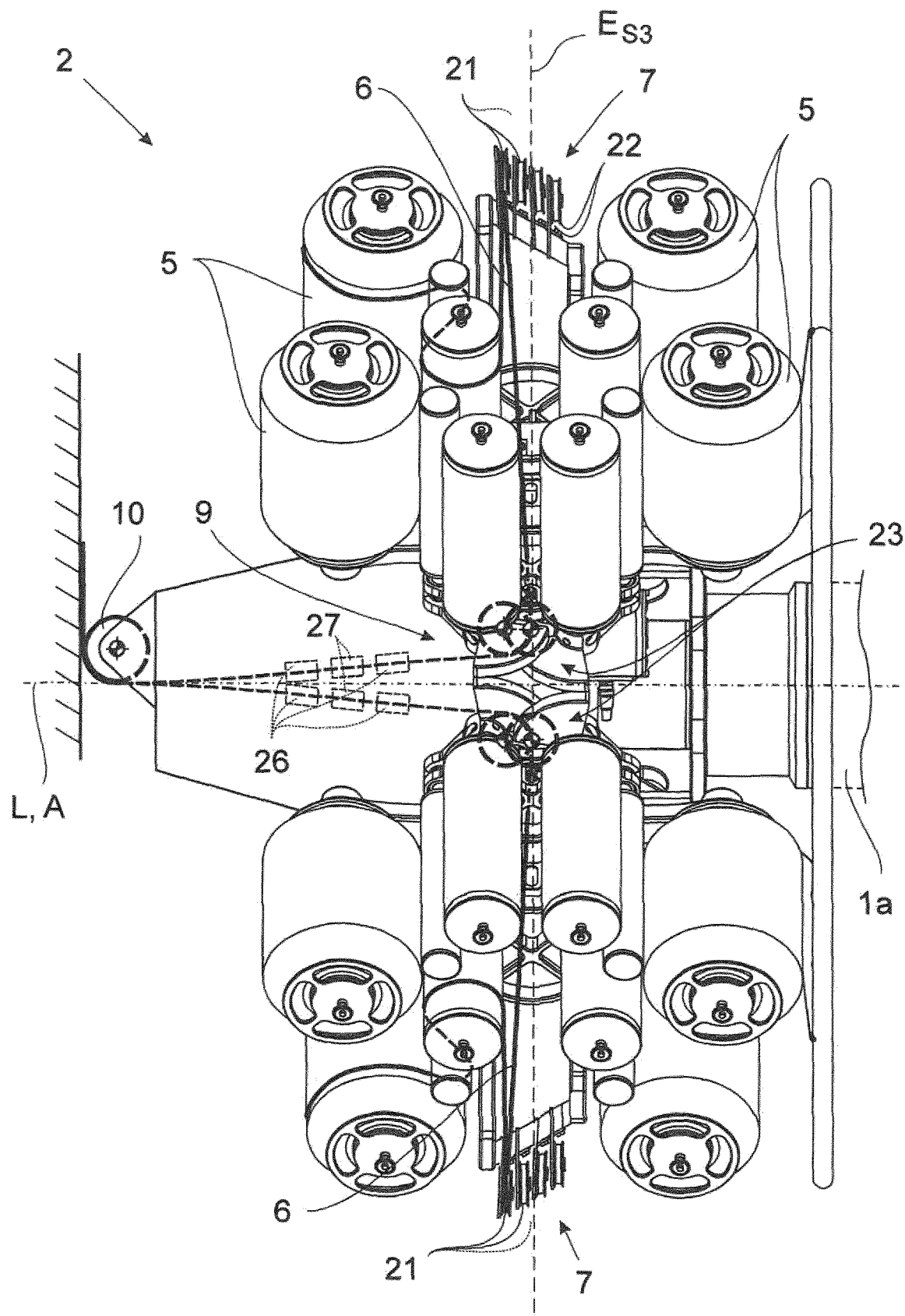
FIG. 2 shows the end effector in a diagrammatic view from the side, in which view merely two fiber strands from a bobbin to the pressure roller are shown for improved comprehension.

FIG. 2 shows the end effector 2 with the longitudinal axis L thereof, along which said end effector 2 extends. The longitudinal axis L is here arranged coaxially with respect to the last movement axis A of the manipulator 1. In addition or as an alternative, the longitudinal axis L can be a center axis of the end effector 2. They coincide in the exemplary embodiment. In the case of said axis, what is known as a "center line" is also generally spoken of.

As can be gathered from the diagrammatic illustration of FIG. 4, a diagonal D which connects the first corner region 8a and the second corner region 8b here intersects a projection of the pressure roller 10, which projection is directed parallel to the longitudinal axis L. As a result, exceptionally simple routing of the fiber strands 6 from the bobbins 5 to the pressure roller 10 is made possible. This applies to a particular extent if the rotational axis $R_A$ of the pressure roller 10 is arranged orthogonally with respect to the diagonal D which connects the first corner region 8a and the second corner region 8b. Apart from the rotational axis $R_A$, the pressure roller 10 is here arranged fixedly on the end effector 2 so as to rotate with respect to the bobbin arrangement or arrangements 4, in particular fixedly so as to rotate about an axis orthogonally with respect to its rotational axis $R_A$ and/or parallel to the longitudinal axis L of the end effector 2.

In addition or as an alternative, the rotational axis $R_A$ of the pressure roller 10 can be arranged at an angle which does not equal 0° and/or at an angle which does not equal 90° with respect to the rotational axes $R_{S1}$, $R_{S2}$ of the bobbins 5. That is to say, the rotational axis $R_A$ of the pressure roller 10 is not perpendicular and/or not parallel with respect to the rotational axes $R_{S1}$, $R_{S2}$ of the bobbins 5. In particular, in the case of an arrangement of this type of the rotational axis $R_A$ of the pressure roller 10 with respect to the rotational axes $R_{S1}$, $R_{S2}$ of the bobbins 5, particularly simple fiber strand routing to the pressure roller 10 can be realized by way of the deflection units 7, 7a, 7b in the corner regions 8, 8a, 8b of the end effector 2. The pressure roller 10 can be arranged with respect to the bobbins 5 in such a way that the rotational axis $R_A$ of the pressure roller 10 is arranged at an angle between 15° and 75°, such as between 30° and 60°, or here 45°, with respect to the rotational axes $R_{S1}$, $R_{S2}$ of the bobbins 5.

Here, furthermore, the pressure roller 10 is arranged in such a way that the longitudinal axis L of the end effector 2 or the "center line" leads past the rotational axis $R_A$ of the pressure roller 10, that is to say does not intersect the latter. It is the case in the exemplary embodiment that the longitudinal axis L or the "center line" makes tangential contact with the rolling face 10a of the pressure roller 10.

Figure 5:
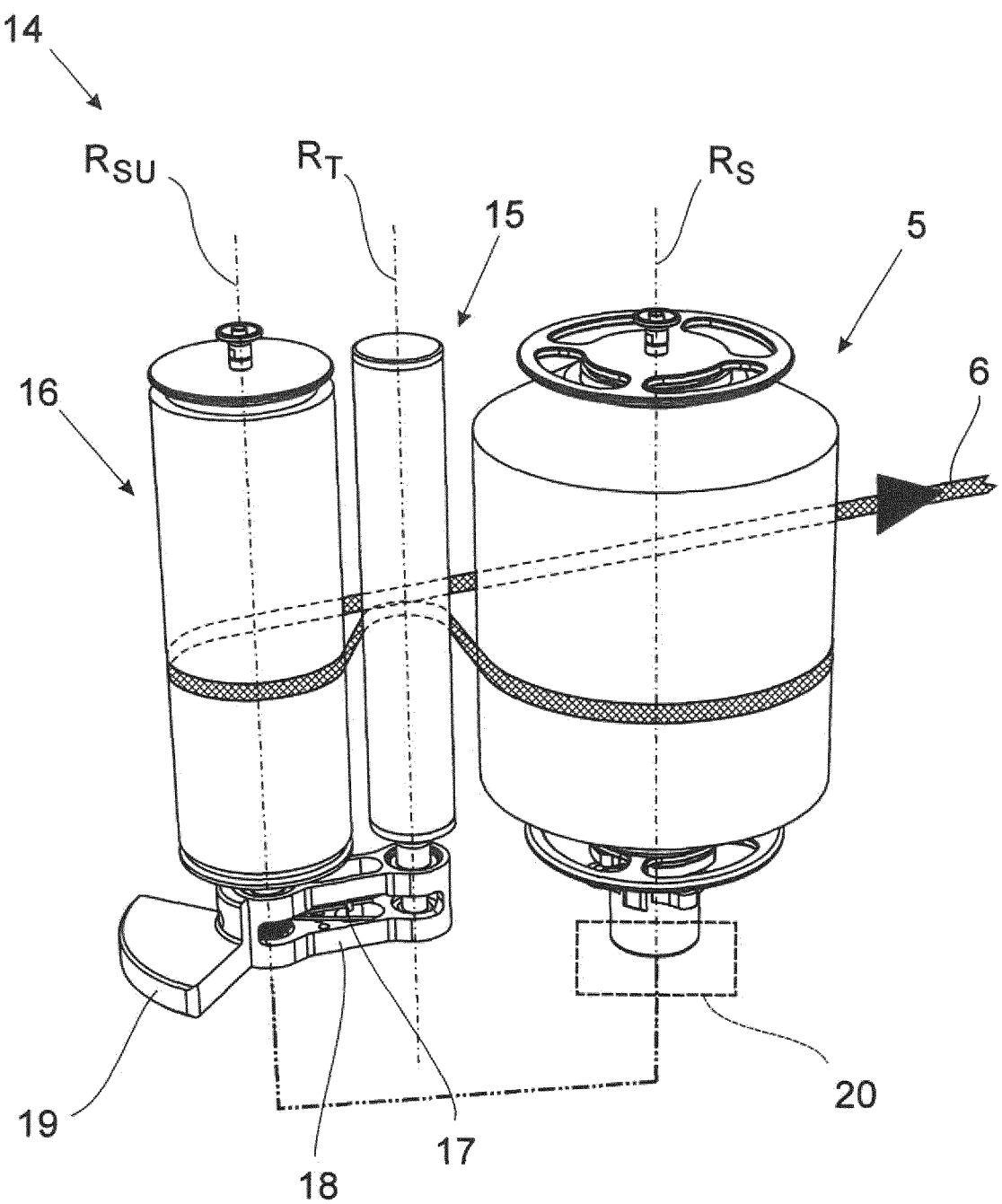
FIG. 5 shows a three-dimensional view of a bobbin unit of the end effector from FIG. 2, in which view the routing of the fiber strand within the bobbin unit is shown.

The fiber strands 6 which are guided to the pressure roller 10 can thus be laid on the laying mold 10 in a particularly satisfactory manner. They are unrolled from the end effector from the bobbins 5 and are fed to the pressure roller 10. The laying of the fiber strands 6 or fibers, in particular carbon fibers and/or glass fibers, of the fiber strands 6 takes place here as a tape of fiber strands 6 over the pressure roller 10. The fiber strands 6 can be what are known as prepregs (pre-impregnated fibers). Here, as shown in FIG. 5, they are configured as a tape material.

Figure 3:
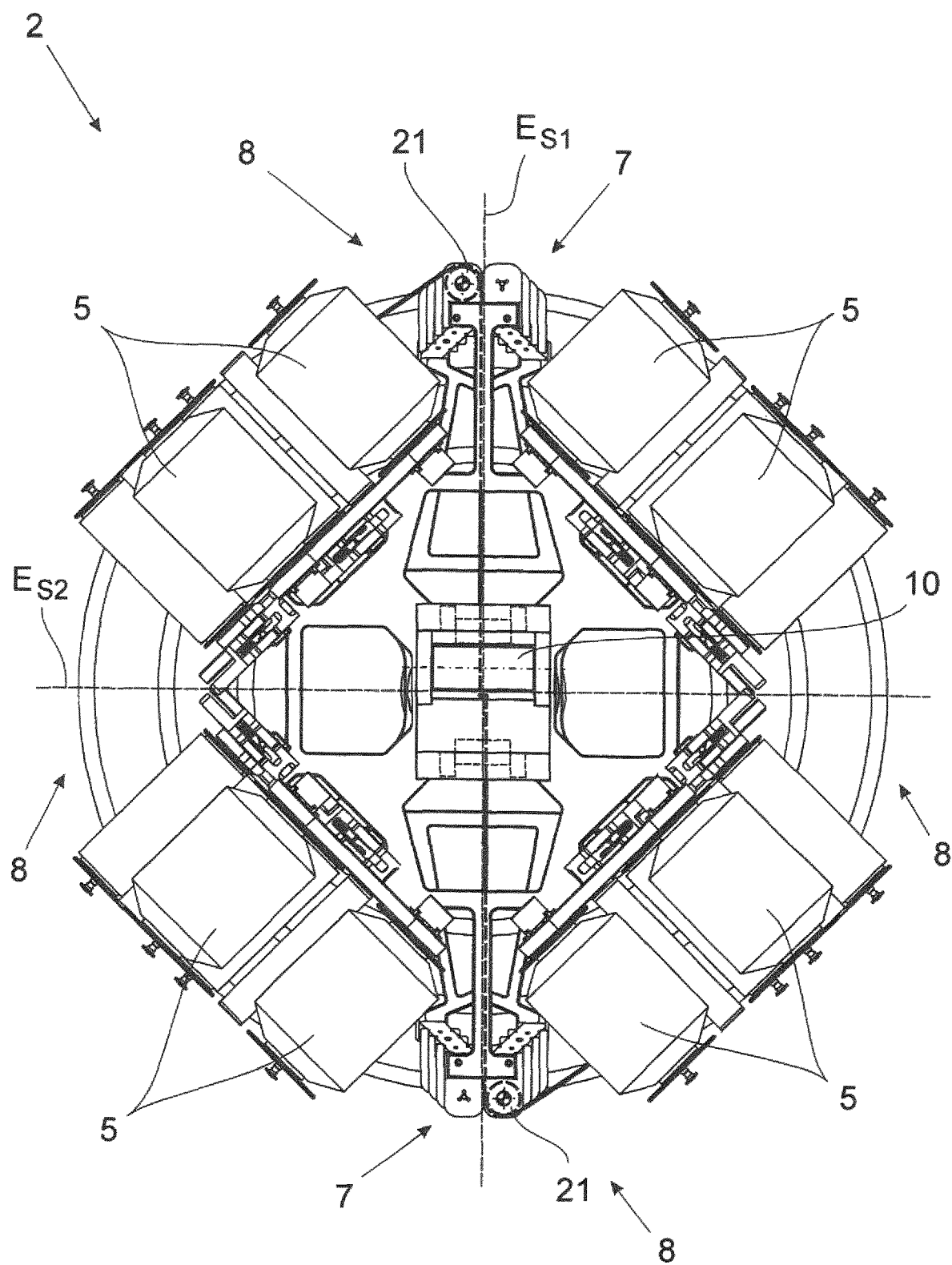
FIG. 3 shows a view from below of the end effector along the longitudinal axis of said end effector, merely two fiber strands also being shown diagrammatically here.

As can be gathered from FIGS. 2 and 3, the end effector 2 here has one or more further bobbin arrangements 4, 4a, 4b of the system type, the fiber strands 6, 6a, 6b of which are guided in each case over the first deflection unit 7a or the second deflection unit 7b into the center region 8 of the end effector 2. The end effector 2 can have at least four, at least six, at least eight, at least twelve, or at least sixteen, bobbin arrangements 4, 4a, 4b of the system type. In the exemplary embodiment, the end effector 2 has a total of eight bobbin arrangements 4 of the system type. This corresponds to sixteen bobbins 5, 5a, 5b.

As can be gathered from FIG. 3, the end effector 2 here has four sides 11, 11a, 11b, 11c, 11d, on which the bobbins 5 of the bobbin arrangements 4, 4a, 4b are arranged. As an alternative, the end effector 2 can also have merely two sides 11, 11a, 11b, on which the bobbins 5 of the bobbin arrangements 4 are arranged. In some embodiments, however, it has at least two or at least four sides 11, 11a, 11b, 11c, 11d, on which the bobbins 5 of the bobbin arrangements 4, 4a, 4b are arranged.

As shown in FIG. 3, the first bobbins 5, 5a of the bobbin arrangements 4, 4a, the fiber strands 6, 6a of which lead to the first deflection unit 7a, are arranged on a first side 11a, and the second bobbins 5, 5b of the bobbin arrangements 4, 4a, the fiber strands 6, 6b of which lead to the first deflection unit 7a, are arranged on the second side 11b. The first bobbins 5, 5a of the bobbin arrangements 4, 4b, the fiber strands 6, 6a of which lead to the second deflection unit 7b, are arranged on the third side 11c, and the second bobbins 5, 5b of the bobbin arrangements 4, 4b, the fiber strands 6, 6b of which lead to the second deflection unit 7b, are arranged on the fourth side 11d.

Here, a carrying element 12 is provided on each side 11, 11a, 11b, 11c, 11d of the end effector 2, which carrying element 12 carries the bobbins 5 which are arranged on said side 11, 11a, 11b, 11c, 11d. In order to save weight, recesses can be provided in the carrying elements 12.

The sides 11, 11a, 11b, 11c, 11d of the end effector 2 here form a polygon in section transversely, in particular orthogonally, with respect to the longitudinal axis L of the end effector 2. The polygon is here a quadrilateral, in particular a square. As an alternative, however, the quadrilateral can also be a rhombus and/or a rectangle.

That corner region 8a of the end effector 2, from which the fiber strands 6 which are merged by the first deflection unit 7a are guided into the center region 8 of the end effector 2, lies here in the region of the sectional edges 13 of planes $E_1$, $E_2$ which extend along the first and the second side 11a, 11b. That corner region 8b of the end effector 2, from which the fiber strands 6 which are merged by the second deflection unit 7b are guided into the center region 9 of the end effector 2, lies here in the region of the sectional edges of planes $E_3$, $E_4$ which extend along the third and the fourth side 11c, 11d of the end effector 2.

In addition, the end effector 2 has two corner regions 8c, 8d which lie opposite one another and are configured without deflection units. Furthermore, all the corner regions 8 of the end effector 2 can be configured without bobbins.

The corner regions 8a, 8b can be delimited toward the interior of the end effector by way of a connecting line V of those axial ends of the bobbins 5 which lie toward the interior of the end effector and lie closest to the first or second deflection unit 7a, 7b. Toward the exterior of the end effector, the corner regions 8a, 8b can be delimited by way of a plane which is oriented orthogonally with respect to the rotational axis $R_{S1}$ of the first bobbin 5a which lies closest to the first or second deflection unit 7a, 7b, and which plane intersects the axial end of said bobbin 5a, and a plane which is oriented orthogonally with respect to the rotational axis $R_{S2}$ of the second bobbin 5b which lies closest to the first or second deflection unit 7a, 7b, and which plane intersects the axial end of said bobbin 5b, cf. FIGS. 3 and 4.

The center region 9 here extends through the end effector 2 along the longitudinal axis L of the end effector 2 as far as the pressure roller 10, the width in the radial direction in relation to the longitudinal axis L being delimited by way of the bobbins 5.

As can be gathered, furthermore, from FIG. 3, the first bobbins 5a of the bobbin arrangements 4a, the fiber strands 6 of which lead to the first deflection unit 7a, have rotational axes $R_{S1}$ which are arranged in parallel. The second bobbins 5b of the bobbin arrangements 4a, the fiber strands 6 of which lead to the first deflection unit 7a, also have rotational axes $R_{S2}$ which are arranged in parallel. This likewise applies here to the respective rotational axes $R_{S1}$, $R_{S2}$ of the first and second bobbins 5, 5a, 5b of the bobbin arrangements 4b, the fiber strands 6 of which lead to the second deflection unit 7b, as is also shown in FIG. 3.

Of the bobbin arrangements 4a, the fiber strands 6 of which lead to the first deflection unit 7a, the axial ends of the first bobbins 5a here lie in each case in one plane. Furthermore, of the bobbin arrangements 4a, the fiber strands 6 of which lead to the first deflection unit 7a, the axial ends of the second bobbins 5b lie in each case in one plane. Here, this also applies analogously in each case to the first and second bobbins 5 of the bobbin arrangements 4b, the fiber strands 6 of which lead to the second deflection unit 7b.

Here, furthermore, in each case the same number of fiber strands 6 from the same number of bobbin arrangements 5 are deflected by the first deflection unit 7a and the second deflection unit 7b.

Furthermore, the bobbins 5 in the exemplary embodiment are arranged mirror-symmetrically with respect to a plane $E_{S1}$ through the first and the second deflection unit 7a, 7b and parallel to a rotational axis $R_U$ of a deflection roller 21 of the deflection unit 7. In addition or as an alternative, the bobbins 5 can be arranged mirror-symmetrically with respect to a plane $E_{S2}$ through the free corner regions 8, 8c, 8d of the end effector 2 and parallel to a rotational axis $R_U$ of a deflection roller 21 of the deflection unit 7, and/or the bobbins can be arranged mirror-symmetrically with respect to a plane $E_{S3}$ orthogonally with respect to the longitudinal axis L of the end effector 2.

The bobbins 5 of a bobbin unit 4 of a system type are here in each case a constituent part of a bobbin unit 14. A bobbin unit 14 of this type is shown in FIG. 5. The system type is then here distinguished by the fact that the bobbin unit 14 has a dancer roller 15 and/or a deflection roller 16. The rotational axes $R_{S1}$, $R_T$, $R_{SU}$ of the bobbin 5 and/or the dancer roller 15 and/or the deflection roller 16 are here arranged parallel to one another.

In the exemplary embodiment and as shown in FIG. 5 by way of example for a bobbin unit 14, the fiber strands 6 of the respective bobbin 5 of a bobbin unit 14 are guided from said bobbin 4 to the dancer roller 15 and around the deflection roller 16 before they are fed to the first or second deflection unit 7, 7a, 7b. The dancer roller 15 here ensures a constant tension of the fiber strand 6 during unwinding of the fiber strand 6 from the bobbin 5. To this end, the dancer roller 15 can be spring-prestressed against the fiber strand 6 by means of a spring. Here, the dancer roller 15 can be moved rotationally. In addition or as an alternative, however, it can also be movable in a linear manner. Moreover, the dancer roller 15 is compensated for gravity. To this end, the bobbin unit 14, in particular a pivoting arm 17 of the bobbin unit 14, which pivoting arm 17 carries the dancer roller 15, has a counterweight 18 which compensates at least partially, or completely, for inertia forces which act on the dancer roller 15 as a consequence of a movement of the end effector 2 by way of the manipulator 1.

Furthermore, the bobbin arrangement 4 of the system type is defined by virtue of the fact that the bobbin 5 has a brake 20. The latter can be a hysteresis brake and/or a pneumatic brake and/or an eddy current brake. The brake force of the brake 20 can be regulated.

Furthermore, the system type can be defined by virtue of the fact that the fiber strands 6 of the first and the second bobbin 5a, 5b are guided mirror-symmetrically from the deflection unit 7, 7a, 7b, such as from the first and second bobbin 5a, 5b, to the pressure roller 10, the plane of symmetry $E_S$ being arranged orthogonally with respect to the rotational axis $R_A$ of the pressure roller 10. Said mirror-symmetrical routing of the fiber strands 6 is shown in the illustration of the fiber strand courses from the bobbins 5 in the direction of the pressure roller in FIG. 6.

Here, the first and/or the second deflection unit 7a, 7b have/has a deflection roller 21, in particular for each of the fed fiber strands 6. Particularly reliable routing of the fiber strands 6 can be achieved as a result. In particular, the deflection rollers 21 can also have guide edges 22 for the individual fiber strands 6.

As can be gathered from FIG. 2, the rotational axes $R_U$ of the deflection rollers 21 of the first and/or second deflection unit 7a, 7b are here arranged in each case orthogonally with respect to the rotational axes $R_{S1}$, $R_{S2}$ of the bobbins 5 and/or with respect to the rotational axis $R_A$ of the pressure roller 10. In combination with the merging in the corner region 8, 8a, 8b of the end effector 2, this also makes a compact construction of said end effector 2 possible. Furthermore, in addition or as an alternative, the deflection rollers 21 of the first and/or the second deflection unit 7a, 7b can be arranged in a V-shaped manner. To this end, the rotational axes $R_U$ of the individual deflection rollers 21 are arranged offset in parallel with respect to one another.

The fiber strands 6 are routed substantially in parallel from the first and the second deflection unit 7a, 7b into the center region 9 of the end effector 2. Substantially parallel routing is to be understood here to mean an angle $W_F$ between the course axes of their fiber strands 6 of at most 5°, at most 3°, or at most 1°. At least one further deflection unit 23 (here, two further deflection units 23a, 23b) can be provided in the center region 9 for deflecting the fiber strands 6 to the pressure roller 10. After being guided into the center region 9 of the end effector 2, the fiber strands 6 from the first deflection unit 7a are deflected by a first further deflection unit 23a and are fed to the pressure roller 10, in particular without further deflection. After being guided into the center region 9 of the end effector 2, the fiber strands 6 from the second deflection unit 7b are likewise deflected by a second further deflection unit 23b and are fed to the pressure roller 10, in particular without further deflection.

Figure 6:
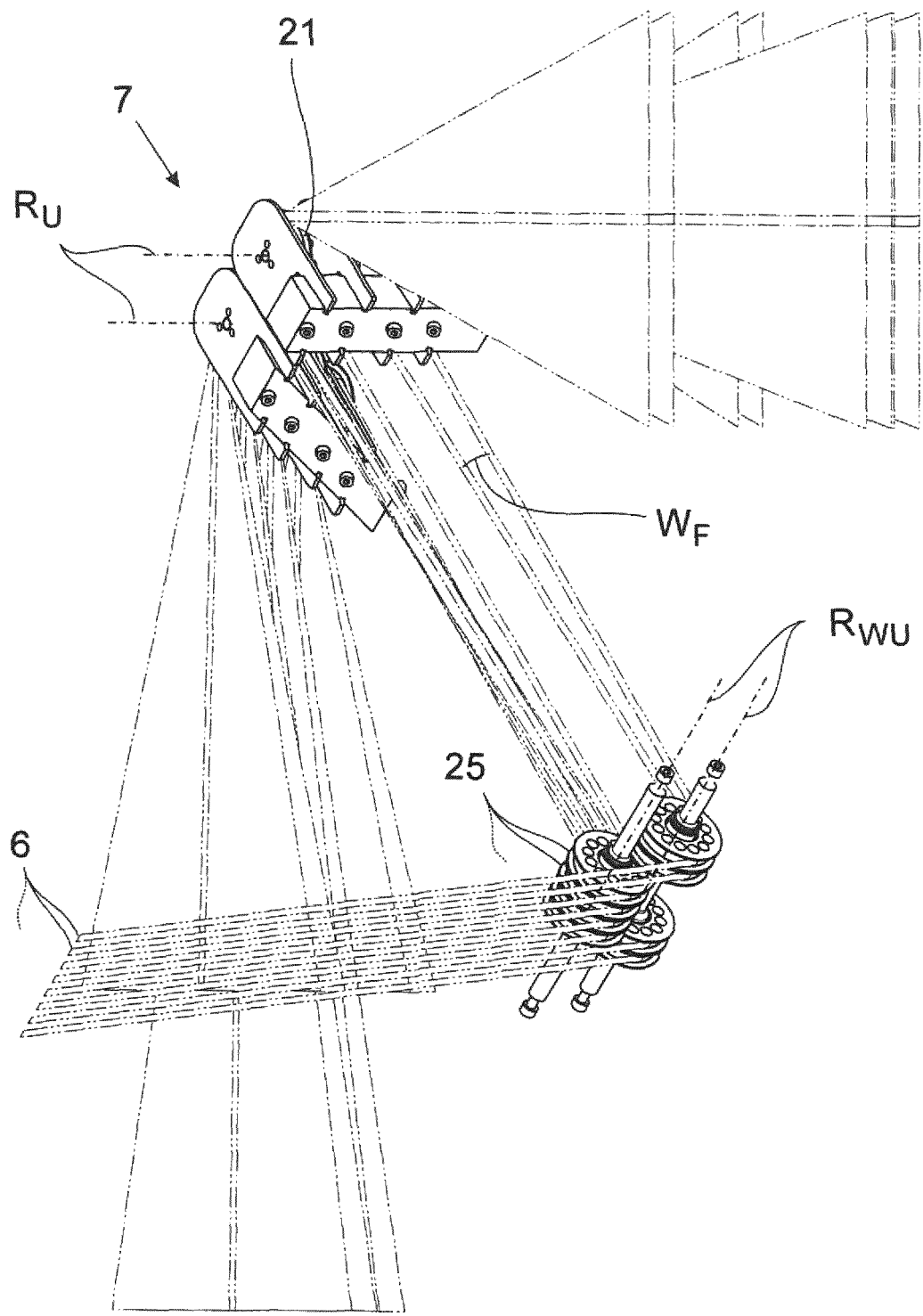
FIG. 6 shows a diagrammatic illustration of the routing of the fiber strands of the bobbins to one of the deflection units and from there further in the direction of the pressure roller.

Here, as shown diagrammatically in FIG. 6, the at least one further deflection unit 23 or the further deflection units 23a, 23b has/have a dedicated deflection roller 24 for each fiber strand 6 which is deflected by it/them. Here, said deflection rollers 24 also have a guide edge 25 for guiding the deflected fiber strand 6. Furthermore, as shown in FIG. 6, the rotational axes $R_{WU}$ of some of the deflection rollers 24 of the first further deflection unit 23a are here offset in parallel with respect to one another. In the exemplary embodiment, the middle (here, the middle four) deflection rollers 24 of the first further deflection unit 23a are offset in parallel in the direction of the pressure roller 10. The second further deflection unit 23b can be likewise configured as has been described above for the first further deflection unit 23a. The deflection rollers 24 of the further deflection unit 23 can be arranged in such a way that the fiber strands 6 which are deflected by them run to the pressure roller 10 in parallel, in particular in one plane. The course axes of the fiber strands 6 between the first further deflection unit 23a or the second further deflection unit 23b and the pressure roller 10 can have an angle of less than 1°.

The fiber strands 6 from the first and the fiber strands 6 from the second deflection unit 7a, 7b are fed here in an alternating manner next to one another to the pressure roller 10 (as shown diagrammatically in FIGS. 2 and 4), with the result that, arranged next to one another, they can be laid from the pressure roller 10 as a tape consisting of fiber strands 6.

In order to convey the fiber strands 6 to the pressure roller 10, the end effector 2 has at least one conveying device 26. In each case at least one conveying unit 26 (here, in each case two conveying units 26) can be provided on the end effector 2 for conveying the fiber strands 6 which are deflected by the first deflection unit 7a, and/or for conveying the fiber strands 6 which are deflected by the second deflection unit 7b. They can be arranged upstream and downstream of a cutting unit 27. The cutting unit or units 27 serves/serve to cut the fiber strands 6 to length, in particular individually, transversely with respect to the course axis of the fiber strands 6.

As in FIG. 2, the first and/or the second deflection unit 7, 7a, 7b are/is here arranged in such a way that the fiber strands 6 run from the respective deflection unit 7a, 7b into the center region 9 through a corridor which is delimited in the direction parallel to the longitudinal axis L by way of two planes which are orthogonal with respect to the longitudinal axis L and run through two bobbin sides which face one another of two bobbins 5 which are adjacent in the longitudinal direction L. Here, the fiber strands 6 are guided through to the first and the second deflection unit 7a, 7b between the bobbins 5 which are adjacent in the longitudinal direction L. From the first and the second deflection unit 7a, 7b, the fiber strands 6 follow the corridor further into the center region 9 of the end effector 2.

Finally, it is also to be noted that the manipulator 1 with the end effector 2 and the laying mold 3 can be set up in an air-conditioned enclosure. As a result, constant ambient conditions can be ensured when the fiber strands 6 are being laid onto the laying mold 3.

The invention claimed is:

1. An end effector for laying down fibers on a laying mold, the end effector comprising at least one bobbin arrangement of a system, the system being defined by virtue of the fact that the bobbin arrangement comprises a first bobbin for providing a first fiber strand and a second bobbin for providing a second fiber strand, a rotational axis of the first bobbin and a rotational axis of the second bobbin being arranged at an angle with respect to one another, the first fiber strand and the second fiber strand being merged over a deflection unit and being guided from a corner region of the end effector jointly into a center region of the end effector and further to a pressure roller,
wherein the corner region is defined from an interior of the end effector as a portion of the end effector that is external to a line connecting an axial end of the first bobbin and an axial end of the second bobbin, wherein the first bobbin and the second bobbin lie closest to the deflection unit.

2. The end effector as claimed in claim 1, wherein the at least one bobbin arrangement comprises a first bobbin arrangement of the system and a second bobbin arrangement of the system, wherein the first fiber strands from the first bobbin arrangement are merged over a first deflection unit and are guided from a first corner region of the end effector jointly into the center region of the end effector and further to the pressure roller, and wherein the second fiber strands from the second bobbin arrangement are merged over a second deflection unit which lies opposite the first deflection unit, and are guided from a second corner region of the end effector, which second corner region lies opposite the first corner region, jointly into the center region of the end effector and further to the pressure roller.

3. The end effector as claimed in claim 2, wherein the first and/or the second deflection unit are/is arranged in such a way that the first and/or second fiber strands from the respective deflection unit run into the center region through a corridor which is delimited in a direction parallel to a longitudinal axis by way of two planes which are orthogonal with respect to the longitudinal axis and run through two mutually facing bobbin sides of two bobbins which are adjacent in the longitudinal direction.

4. The end effector as claimed in claim 2, wherein the end effector comprises one or more further bobbin arrangements of the system, the fiber strands of which are guided in each case over the first deflection unit or the second deflection unit into the center region of the end effector.

5. The end effector as claimed in claim 4, wherein the end effector comprises at least 4 bobbin arrangements of the system.

6. The end effector as claimed in claim 4, wherein the end effector comprises at least two sides, on which the first and second bobbins of the at least one bobbin arrangement are arranged,
the first bobbins being arranged on a first side of the at least one bobbin arrangement, the first fiber strands of which lead to the first deflection unit,
the second bobbins being arranged on the second side of the at least one bobbin arrangement, the second fiber strands of which lead to the first deflection unit,
the first bobbins being arranged on a third side of the at least one bobbin arrangement, the first fiber strands of which lead to the second deflection unit,
the second bobbins being arranged on a fourth side of the at least one bobbin arrangement, the second fiber strands of which lead to the second deflection unit.

7. The end effector as claimed in claim 6, wherein the first side, the second side, the third side, and the fourth side of the end effector form a polygon in cross section, in the section transversely with respect to the longitudinal axis of the end effector.

8. The end effector as claimed in claim 7, wherein the polygon is a quadrilateral.

9. The end effector as claimed in claim 7, wherein the first and second bobbins are arranged mirror-symmetrically with respect to a plane through the first and the second deflection unit and parallel to a rotational axis of a deflection roller of the deflection unit, and/or wherein the first and second bobbins are arranged mirror-symmetrically with respect to a plane through the corner regions of the end effector and parallel to a rotational axis of a deflection roller of the deflection unit, and/or wherein the first and second bobbins are arranged mirror-symmetrically with respect to a plane which is orthogonal with respect to the longitudinal axis of the end effector.

10. The end effector as claimed in claim 9, wherein, furthermore, the system is defined by virtue of the fact that the first and second bobbins of the system are in each case a constituent part of a bobbin unit, and that the bobbin unit comprises a dancer roller and/or a deflection roller, and wherein the first fiber strands and/or the second fiber strands of the respective bobbin of a bobbin unit are guided from said bobbin to the dancer roller and around the deflection roller before they are fed to the first or second deflection unit.

11. The end effector as claimed in claim 10, wherein the first and/or second deflection unit comprises (in each case) one deflection roller for the first and/or second fiber strands which are fed to them/it, and wherein a rotational axes of the deflection roller of the first and/or second deflection unit is arranged in each case orthogonally with respect to the rotational axes of the bobbins and/or of the pressure roller.

12. The end effector as claimed in claim 11, wherein the deflection rollers of the first and/or second deflection unit are arranged in a V-shaped manner, and/or wherein the rotational axes of the deflection rollers are arranged offset radially with respect to one another.

13. The end effector as claimed in claim 1, wherein the end effector extends along a longitudinal axis, wherein a diagonal which connects the first corner region and the second corner region intersects a projection of the pressure roller, which projection is directed parallel to the longitudinal axis, and further wherein a rotational axis of the pressure roller is arranged orthogonally with respect to the diagonal which connects the first and the second corner region.

14. The end effector as claimed in claim 13, wherein the rotational axis of the pressure roller is arranged at an angle which does not equal 0° and/or at an angle which does not equal 90° with respect to the rotational axes of the bobbins.

15. The end effector as claimed in claim 1, wherein, furthermore, the system is defined by virtue of the fact that the first fiber strands and the second fiber strands of the first and the second bobbin are fed in a mirror-symmetrical manner from the deflection unit to the pressure roller, a plane of symmetry being arranged orthogonally with respect to a rotational axis of the pressure roller.

16. The end effector as claimed in claim 1, wherein, after being guided into the center region of the end effector, the first and/or second fiber strands from the first deflection unit or the first and/or second fiber strands from the second deflection unit are deflected by a further deflection unit, and are fed to the pressure roller.

17. The end effector as claimed in claim 1, wherein the first and/or second fiber strands from the first deflection unit and the first and/or second fiber strands from the second deflection unit are fed to the pressure roller in an alternating manner next to one another, and wherein, arranged next to one another, they are deposited from the pressure roller as a tape consisting of fiber strands.

18. A manipulator with an end effector as claimed in claim 1.

19. The end effector as claimed in claim 1, wherein, furthermore, the system is defined by virtue of the fact that the first and second fiber strands of the first and the second bobbin are fed in a mirror-symmetrical manner from the deflection unit from the first and second bobbin, to the pressure roller, a plane of symmetry being arranged orthogonally with respect to a rotational axis of the pressure roller.

20. The end effector as claimed in claim 1, wherein, after being guided into the center region of the end effector, the first and/or second fiber strands from the first deflection unit or the first and/or second fiber strands from the second deflection unit are deflected by a further deflection unit, in each case by a further deflection unit, and are fed to the pressure roller, without further deflection.

* * * * *